United States Patent
Legnain et al.

(10) Patent No.: US 7,457,641 B1
(45) Date of Patent: Nov. 25, 2008

(54) METHOD AND APPARATUS FOR INCREASING CAPACITY FOR WIRELESS DATA TRANSMISSIONS

(75) Inventors: Abdelgader Legnain, Nepean (CA); Peter Deane, Fitzroy Harbour (CA); Neil McGowan, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 616 days.

(21) Appl. No.: 11/286,415

(22) Filed: Nov. 25, 2005

Related U.S. Application Data

(60) Provisional application No. 60/648,186, filed on Jan. 28, 2005, provisional application No. 60/631,043, filed on Nov. 24, 2004.

(51) Int. Cl.
*H04Q 7/20* (2006.01)
(52) U.S. Cl. ............... 455/562.1; 455/561; 455/550.1; 455/450; 455/509; 455/453
(58) Field of Classification Search .............. 455/562.1, 455/561, 550, 450–452.1, 453, 500, 509, 455/422.1, 403, 412.1, 412.2, 426.1, 426.2, 455/512, 517
See application file for complete search history.

(56) References Cited

U.S. PATENT DOCUMENTS

| | | | |
|---|---|---|---|
| 7,239,879 B2 * | 7/2007 | Avidor et al. ............ | 455/456.5 |
| 2002/0072393 A1 | 6/2002 | McGowan et al. | |
| 2004/0063468 A1 * | 4/2004 | Frank ....................... | 455/561 |

| | | | |
|---|---|---|---|
| 2004/0092291 A1 | 5/2004 | Legnain et al. | |

OTHER PUBLICATIONS

Third Generation Partnership Project 2, "cdma2000 High Rate Packet Data Air Interface Specification—Addendum 1" Telecommunications Industry Association, IS-856-1, Jan. 2002, pp. 1-589.
Third Generation Partnership Project 2, "cdma2000 High Rate Packet Data Air Interface Specification", Telecommunications Industry Association, IS-856, Mar. 2004, pp. 1-1083.
Nandlall, "cdma2000 1xEV-DO: An Easy Upgrade Path To Mobile Broadband Services", Nortel Technical Journal, Issue 2, Jul. 2005, pp. 6-12.

* cited by examiner

*Primary Examiner*—Keith T Ferguson
(74) *Attorney, Agent, or Firm*—Jeffrey M. Measures; Borden Ladner Gervais LLP

(57) ABSTRACT

A method and apparatus for transmitting wireless data to users which increases the wireless capacity for data transmissions within a sector served by a base station is disclosed. Accordingly, the sector is subdivided into a plurality of beams, typically by means of beam forming antennas, and the user data to be transmitted is time division multiplexed by scheduling the data into timeslots for transmission via the beams. Capacity is thus increased by decreasing network interference and/or transmitting data to more than one user at the same time by means of the multiple beams, and time division multiplexing the data. Preferably multiple users can be scheduled on multiple beams simultaneously in order to increase capacity. Preferably the same user can be allocated more than one beam if the radio conditions warrant. Such a system is optimized for data and carries out the following steps: a. Evaluating the reverse link wireless conditions for each user; b. responsive to step a, generating information defining the beam or beams to be utilized by each user; c. generating a Scheduler Metric (SM) for every user; d. scheduling each of the n beams based on the SM and said information for each user; and e. transmitting data scheduled in step d on said n beams.

23 Claims, 8 Drawing Sheets

METHOD AND APPARATUS FOR INCREASING CAPACITY FOR WIRELESS DATA TRANSMISSIONS

CROSS REFERENCE TO RELATED APPLICATIONS

This application claims the benefit of U.S. Provisional Application Nos. 60/631,043, filed [Nov. 24, 2004], and 60/648,186 Filed Jan. 28, 2005, which are incorporated herein by reference.

FIELD OF THE INVENTION

The present invention relates generally to wireless networks, and in particular, to methods and apparatus for increasing capacity. More particularly, the present invention relates to data optimizing multi-sector base stations using beam switching.

BACKGROUND OF THE INVENTION

The demand for wireless services has progressively increased since cellular telephony was first introduced. A recurring problem is how to allocate scarce radio resources to an ever increasing number of wireless users. Various wireless protocols have been devised to share the available bandwidth with a plurality of users, including TDMA, GSM and CDMA.

Another way to increase the number or users is to reuse the wireless spectrum over a geographic area by subdividing the service area into cells, each serviced with a base station. Cells are then subdivided into sectors, typically 3 per cell, with the base station including a directional antenna per sector.

In general, it is desired to have as few base stations as possible. This is because base stations are expensive and require extensive effort in obtaining planning permission. In some areas, suitable base station sites may not be available. In order to have as few base stations as possible, each base station ideally has as large a capacity as possible in order to service as large a number of wireless terminals as possible. Several key parameters that determine the capacity of a CDMA digital cellular system are: processing gain, ratio of energy per bit to noise power, voice activity factor, frequency reuse efficiency and the number of sectors in the cell-site antenna system.

AABS (Adaptive Antenna Beam Selection) is a method used in CDMA cellular Base Stations to improve traffic capacity in "hot spot" sectors without requiring additional carriers (i.e. more spectrum) at the hot spot. This spectrally efficient technique replaces the standard sector antenna beam pattern with a multiplicity, typically three, of beams per sector. In other words, to further increase capacity, sectors have been subdivided into beams.

These new beams have higher directivity on both the forward and reverse links. This higher directivity reduces the forward interference seen by a terminal and reduces the received interference level at the base station's receiver. Consequently, the RF power required to support a typical call in the forward ink is lower than that required for a conventional antenna beam. This results in a significantly greater number of AABS calls being supportable with a base station's limited transmitter power than is possible with a conventional sector beam.

In a similar manner to the forward link situation, the reverse link AABS beams are more directive than a conventional sector beam. As a result, the terminal's RF power required to support a typical call in an AABS sector will be lower than for a conventional sector call. This will also help prolong the terminal's battery life.

An example of such an AABS system is described in U.S. patent application Ser. No. 10/698,395, filed Nov. 3, 2003 and U.S. application Ser. No. 09/733,059 which was filed on Dec. 11, 2000, which are hereby incorporated in reference in their entirety.

In the past, wireless networks primarily provided telephony services (i.e., voice calls). Today, wireless networks are evolving to provide a variety of data services, including interactive, real-time, and delay-sensitive applications, such as VoIP, video conferencing, mobile gaming, mobile music, and high-speed file transfers. As wireless spectrum is limited, there is a need for a more efficient allocation of radio resources to support different types of users whose bandwidth requirements can vary substantially. Increasingly, wireless users want access to a diverse set of data and multimedia applications with different bandwidth demands, as well as to real-time applications (such as gaming and video) where minimum performance guarantees are required in terms of bandwidth, delay, and bit error rate.

One approach to satisfy these requirements is the CDMA 2000 1xEV-DO standard, which was introduced to handle significantly higher data rates on the downlink (for web browsing, for example) and to efficiently implement a packet data service, which was constrained because voice and data in traditional CDMA systems were carried over the same radio frequency (RF) carrier. Such a system is described in the article CDMA2000 1xEV-DO: An Easy Upgrade Path to Mobile Broadband Services by Vish Nandlall, published in the July 2005 edition of the Nortel Technical Journal, which is hereby incorporated by reference. 1xEV-DO has been defined by the Third Generation Partnership Project 2 (3GPP2), a collaboration of several standards bodies from around the world that is developing technical specifications and a framework for third-generation CDMA wireless networks. Specifically, 3GPP2 has defined a data-only version of CDMA called CDMA2000 High Rate Packet Data (HRPD)—more commonly referred to as 1xEV-DO. The "1x" prefix stems from its use of 1 times the 1.2288 mega chips per second (Mcp) spreading rate of a standard IS-95 CDMA channel. "EV" emphasizes that it is an EVolutionary technology that builds and improves on CDMA 2000 technology. The "DO" (data optimized) suffix indicates that 1xEV-DO is designed to efficiently transfer data. The 3GPP2 technical specification for 1xEV-DO is C.S0024-A v. 1.0, and has been published as a North American standard by the Telecommunications Industry Association (TIA) as IS-856, which is hereby incorporated by reference.

One advantage of the 1xEV-DO systems is they provide a high bandwidth ("fat pipe") data channel, which can be shared by a plurality of users who are serviced by the same sector of a base station. At a high level, the 1 xEV-DO divides a CDMA channel into timeslots, and assigns user data to each timeslot. Accordingly, 1xEV-DO is combines CDMA with time division multiplexing (TDM) to increase capacity.

However, the IS-856 standard does not provide any mechanism for providing additional capacity in "hot spots" by dividing a 1xEV-DO sector into beams. One of the advantages of using beam antennas is it increases capacity. However this increase in capacity is achieved conventionally by sectorization, i.e., the division of an area into smaller areas in order to increase capacity by reusing resources in smaller areas. A known problem with increased sectorization is interference. It becomes increasing more difficult to "plan" pilot PN's or "assign" PN offsets that do not degrade the network performance because the re-use distance gets smaller and smaller as the pilot density increases due to uncontrolled sectorization. This effect is known in the industry as "pilot Pollution" and has a number of deleterious impacts on a network including dropped call rate increases and access failure rate increases. Consequently sectorization density above a certain limit in a network should be avoided if possible. We avoid this problem by re-using PN offsets within a sector, even if the sector is divided into beams. In other words, each beam within a sector uses the set of PN offsets allocated to the sector, thus not increasing number of PN offsets per BTS (or per unit area) due to this re-use.

It is, therefore, desirable to provide a base station which can maximize throughput for maximum number of data users in a sector.

SUMMARY OF THE INVENTION

It is an object of the present invention to improve wireless capacity for data transmissions within a sector served by a base station. Accordingly, the sector is subdivided into a plurality of beams, typically by means of beam forming antennas, and the user data to be transmitted is time division multiplexed by scheduling the data into timeslots for transmission via the beams. Capacity is thus increased by decreasing network interference and/or transmitting data to more than one user at the same time by means of the multiple beams, and time division multiplexing the data.

Preferably multiple users can be scheduled on multiple beams simultaneously in order to increase capacity. Preferably the same user can be allocated more than one beam if the radio conditions warrant.

In a first aspect, the present invention provides a method of transmitting wireless data to users within a sector served by a plurality of beam antennas which divides said sector into n beams comprising: a. Evaluating the reverse link wireless conditions for each user; b. responsive to step a, generating information defining the beam or beams to be utilized by each user; c. generating a Scheduler Metric (SM) for every user; d. scheduling each of the n beams based on the SM and said information for each user; and e. transmitting data scheduled in step d on said n beams.

In a further embodiment, there is provided a A base station for providing wireless communication to a plurality of users within a serving area comprising: An antenna array including a plurality of antennas with each antenna serving a sector of the serving area; At least one of said antennas comprising a plurality of beam forming antennas to divide the sector served by said antenna into a plurality of beams; Beam Selection and Scheduling means for assigning user traffic within the divided sector onto said beams, said controller executing a combined beam selector and scheduler that assigns user data to timeslots and beams; and A transceiver, coupled to said plurality of beam antennas, for transmitting said user data on the assigned beams during the assigned timeslots.

In further aspect, the present invention provides a base station for handling data traffic comprising: an antenna array for subdividing a service area into a plurality of sectors with an antenna for each sector; at least one said antenna comprising a beam forming antenna for subdividing the sector supported thereby into at least two beams; and at least one data radio transmission unit (DRTU) for transmitting data traffic to users via said antenna array; said DRTU including a controller for controlling data transmission with the sub-divided sector comprising: a beam selector for selecting which beam to transmit data for any given user within a sub-divided sector; and a scheduler to divide the data traffic to be transmitted into time-slots and to assign user data to each of the established time slots.

Said beam selector and scheduler can be implemented sequentially. Preferably they are integrated. Preferably DRTU includes a beam selector for monitoring signals received from a given user in the service area of the beam forming antenna and causing the data traffic destined for that user to be transmitted using the beam providing the highest quality of signal to and from that user in a time slot selected by a scheduler such that, in at least some circumstances, data traffic will be sent simultaneously to more than one user within the sector supported by the beam forming antenna. The DRTU includes a controller, which includes a processor(s), and associated memory, for executing software for implementing the described methods.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for increasing throughput/capacity for data users in a network of wireless cells divided into different sectors, some of which are subdivided into beams. Preferred embodiments will be described with respect to the example of 1xEV-DO and AABS systems, but the invention can also be applied to other systems which use beam forming antennas (i.e. sectors which are subdivided into a plurality of beams, and use some form of beam selection) and scheduling of user data into timeslots.

Three architectures are discussed, which progressively increase in both complexity (of implementation) and capacity. The first two architectures have the advantage of ease of implementation and cost, as they reuse existing routines, but do not offer the same capacity increases as is capable with the $3^{rd}$ architecture. For the $3^{rd}$ architecture we describe 5 examples of algorithms, which also progressively increase in both complexity (of implementation) and capacity. Determining which to use involves a Tradeoff between the complexity (and therefore cost) of the base station versus capacity required. For example the more complex methods may not be appropriate for a base station with limited signalling processing power (hardware). Note that existing base stations which already include a beam selection sector can be upgraded to DO service by adding a DO module to the digital shelf (the rest of the hardware is identical and this module will generally be configured to use existing radios and "conventional" antennas at the site). In order to make the jump to AABS and DO we will obviously need an AABS antenna (which typically requires 4 feeder cables but these may already be there if the site has already got 1X AABS service). In addition, an AABS sector requires 2 additional radios for a total of 3 radios (1 for each beam) and these radios need to be connected to the AABS antenna. However, it is likely that these will also be configured and connected to the antenna at the site if there is a 1X AABS service there already. Expressed another way, if there is a 1X AABS service at a BTS the DO service function only requires the hardware addition of a DO module at the BTS, or an appropriate software upgrade, depending on the architecture.

Figure 1:
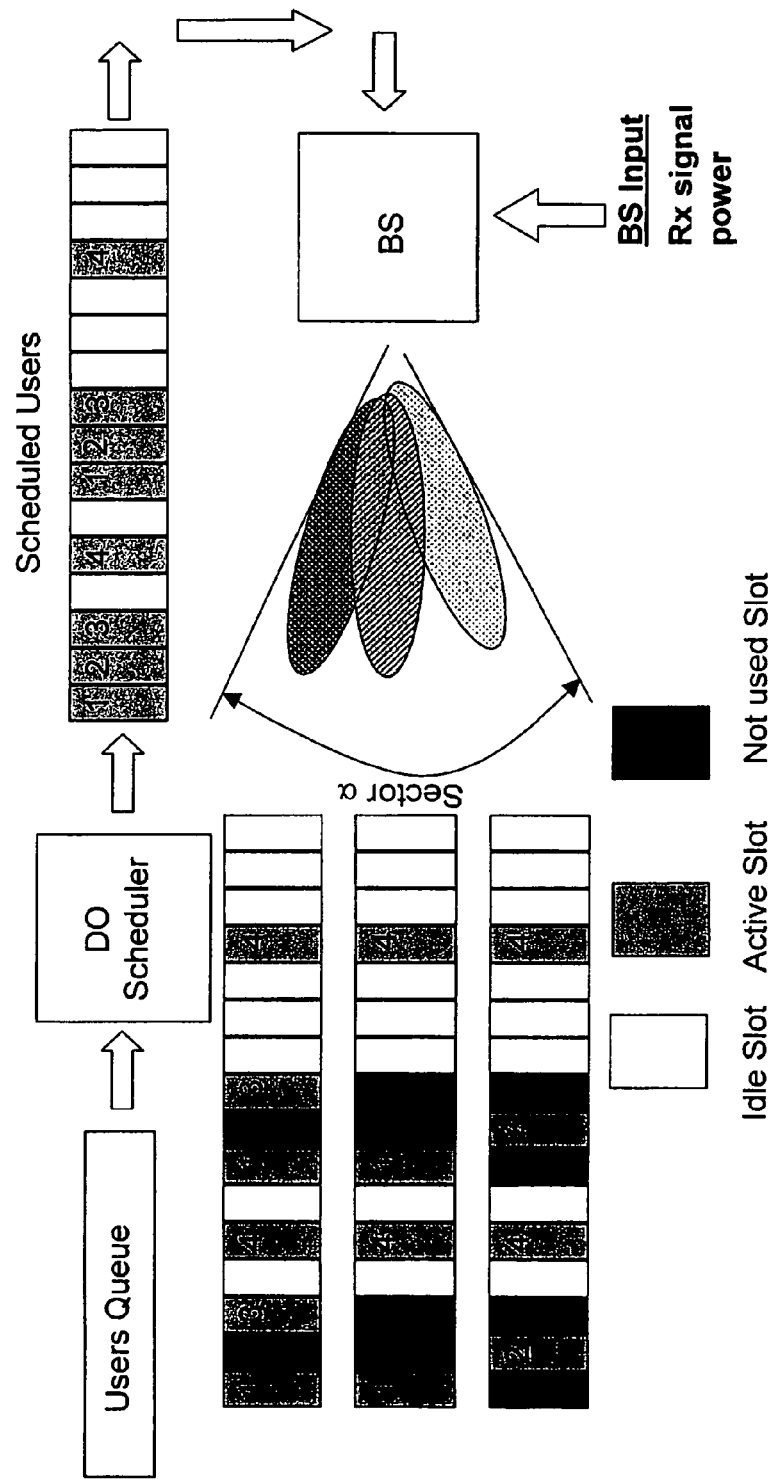
FIG. 1 is a schematic diagram illustrating how a base station queues user data onto time slots and beams according to a first architecture.

FIG. 1 is a schematic diagram illustrating how a base station queues user data onto time slots and beams according to a first architecture. This figure only illustrates the process for sector alpha, which in this example is split into 3 beams. User data to be transmitted by the base station into sector alpha arrives and is buffered in a users queue. The user data can vary greatly between users, with different latency priorities and sizes. A scheduler evaluates the different priorities of the user data according to scheduling metric, and outputs a "packet" of user data sufficient to fill one time slot. Each non-idle time slot contains data for a particular user. If there is excess capacity, there will be idle time slots as there are more time slots available than required for the data to be transmitted. In this figure, only 4 users are shown, and the scheduler has successively scheduled the first 3 users into the first 3 timeslots. The $4^{th}$ time slot is idle, and then data is allocated for the $4^{th}$ user in the $5^{th}$ timeslot. The $6^{th}$ time slot is idle, and then user data for users 1, 2, and 3 are scheduled in $8^{th}$, $9^{th}$, and $10^{th}$ timeslots respectively. Note that if user 2 had a higher priority, or more data than the other users, than the order would have been changed, or user 2 may have had data scheduled in consecutive timeslots.

The Scheduled time slots are input to the Beam Selector BS, which evaluates the wireless conditions (e.g., the reverse-link signals received from each user) to determine on which beam or beams any given user is to be allocated. In other words, the BS analyzes the relative strength of the reverse link received by all 3 antennas for each user. It is of course to be understood that the BS need not be a separate physical block, and is likely implemented in software executed by a processor.

The BS sends each timeslot of data it receives from the Scheduler to the appropriate antenna (via a transceiver). Thus, in the example shown in FIG. 1, User 1 is allocated to both Beam 3 and Beam 2. In other words the first timeslot contains User 1 data and is transmitted on both Beam 3 and Beam 2. This user is considered to be in a special form of soft handoff, which we will call super soft handoff, as the user is receiving data on both beams. This typically occurs if the user is located between the beams, or is moving from one beam to another. Unlike normal soft handoff, which is controlled by the terminal, super soft handoff is controlled by the BTS, as the BTS determines whether to transmit on more than one beam to a user. Note the use of super soft handoff is optional, as the BS could simply chose 1 beam for the user if no super soft handoff is allowed.

Thus timeslot 1 has user 1 on Beams 2 and 3, and is not used on Beam 1. User 2 is allocated to Beam 1, thus timeslot 2 has user 2 on Beam 1, and is not used on Beams 2 and 3. Likewise timeslot 3 has user 3 on Beam 3, and is not used on Beams 2 and 1. Timeslot 4, being idle, is not used on either beam. User 4 is in super soft handoff on all 3 beams. Thus timeslot 4, allocated to user 4, is active on all 3 beams.

Thus the architecture in FIG. 1 only allows 1 user per time-slot, although the user may be on any beam (or on multiple beams). This architecture is the simplest to implement of the three architectures discussed, but it is the least efficient with respect to maximizing throughput in the sector, as compared to conventional 1xEV-DO architectures. However, even though this architecture only allows one user per time-slot in the sector, it does have some advantages, from a network perspective. Firstly, as three beams of narrower focus are used, the overall interference is reduced, especially when less than 3 beams are used. Although the capacity (users, or amount of data per user) does not increase in the sector, the radio resources (e.g., the power requirements) used to achieve this capacity is less than conventional 1xEV-DO architectures. This allows for more re-use of the radio resources in nearby sectors. Thus it has the potential to increase overall network capacity.

Secondly, the quality of the signal (e.g, carrier to Interference ration) for each user can increase due to the increased gain of the more focussed beams.

Figure 2:
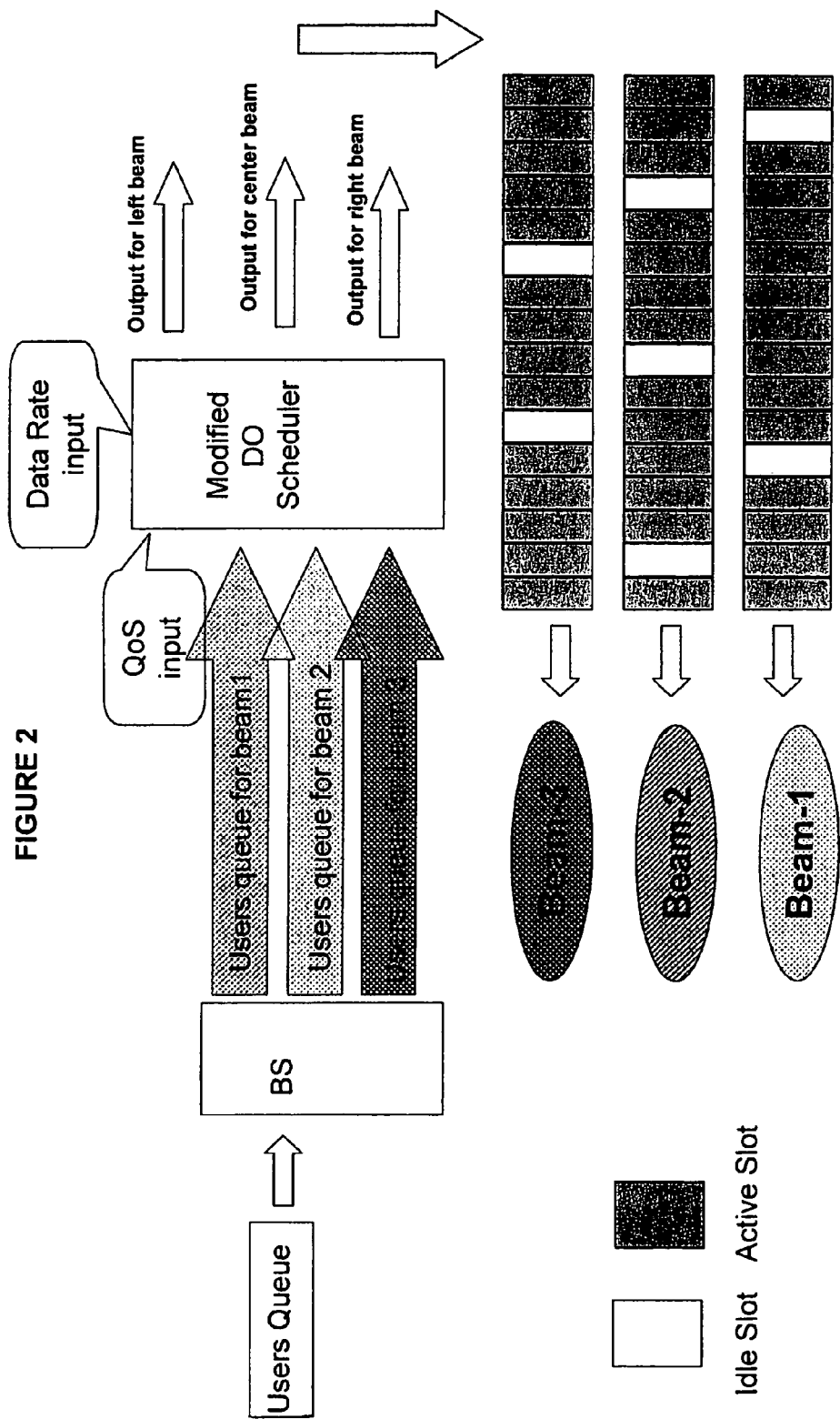
FIG. 2 is a schematic diagram illustrating how a base station queues user data onto time slots and beams according to a second architecture.

FIG. 2 is a schematic diagram illustrating how a base station queues user data onto time slots and beams according to a second architecture. Once again, this figure only illustrates the process for sector alpha, which in this example is split into 3 beams. User data to be transmitted by the base station into sector alpha arrives and is buffered in a users queue.

A difference between these two architectures is the order of the BS and Scheduler. In FIG. 2, the user queue is first processed by a Beam Selector BS, which evaluates the wireless conditions (e.g., the reverse-link signals received from each user) to determine on which beam any given user is to be allocated. Conventional BS processes can be used, with the modification that in this architecture, each user can only be assigned to one beam. Once again, it should be understood that the BS need not be a separate physical block, and is likely implemented in software executed by a processor (CPU, DSP, etc.).

The BS effectively produces 3 Beam Queue signals, each of which are then fed to a scheduler (or an instance of a scheduler). In any event, the scheduling operation occurs for each beam queue, where user data is scheduled into time slots on each beam, with each non-idle time slot containing data for a particular user. Each time slot (i.e. the user data scheduled within a time slot is then transmitted by the appropriate beam antenna (after radio processing by a transceiver, diplexing, etc.).

As each beam is separately scheduled, each beam can have data assigned to each timeslot. Thus this architecture provides up to 3 times the capacity of architecture 1, within the sector in question. It also has some of the network advantages described above. However, it does not allow for super soft handoff. This means that some terminals which would be best served by multiple beams, will have poorer signal quality, will result in more retransmission of data consequently reduced data throughput for mobiles in these locations between the beams.)

Figure 3:
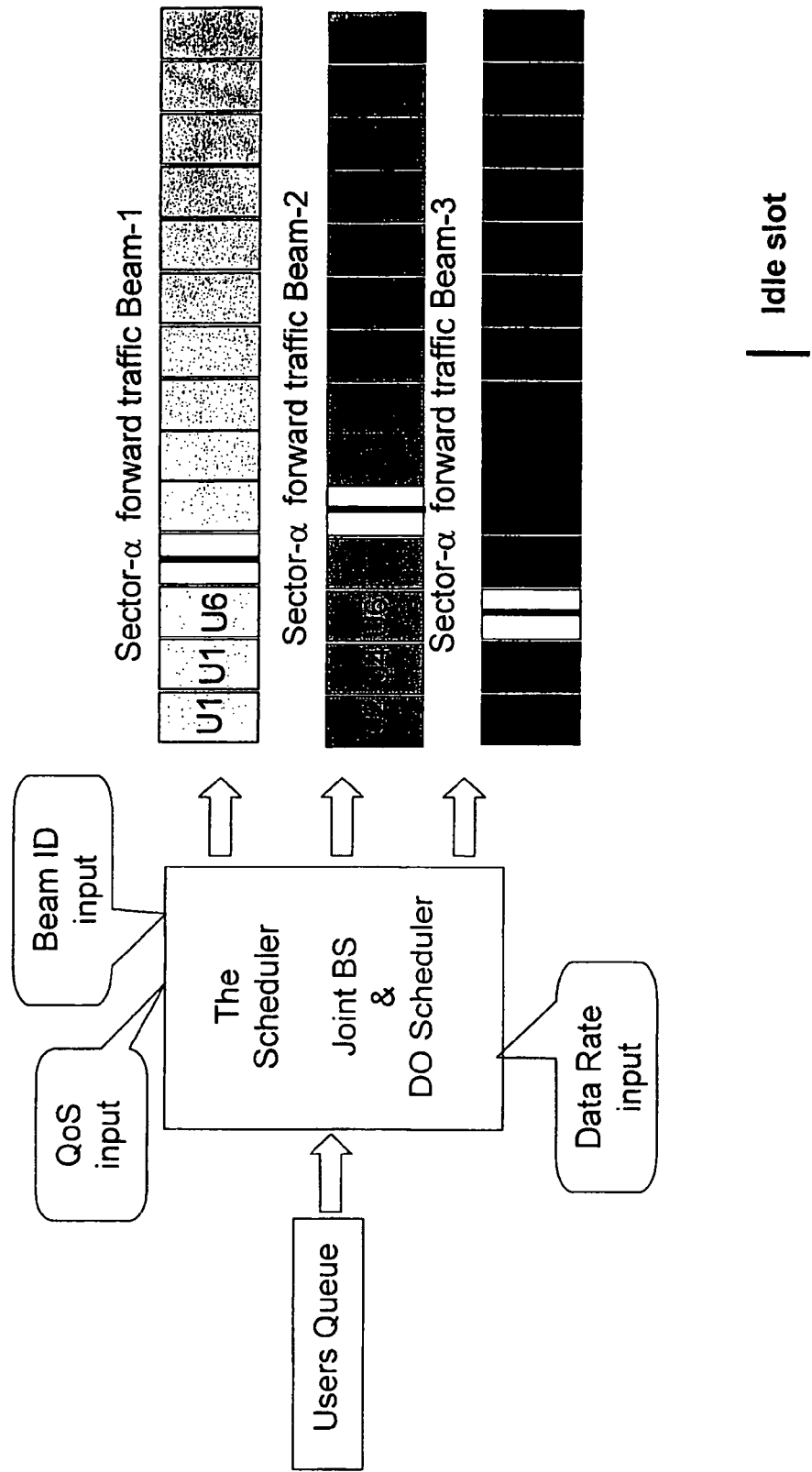
FIG. 3 is a schematic diagram illustrating how a base station queues user data onto time slots and beams according to a third architecture.

FIG. 3 is a schematic diagram illustrating how a base station queues user data onto time slots and beams according to a third architecture. Once again, this figure only illustrates the process for sector alpha, which in this example is split into 3 beams. Once again user data to be transmitted by the base station into sector alpha arrives and is buffered in a users queue. In this architecture, the BS and Scheduler are integrated in order to maximize capacity and efficiency. In other words the BS and Scheduler algorithms are designed with the ability to consider both the beams to be used, and the timeslots, together, rather than sequentially in the previous too architectures.

In the example shown, six users are scheduled in the first 3 time slots across all 3 beams. Note that this architecture allows for user data to be scheduled on all 3 beams for each timeslot, while permitting super soft handoff as required. As shown users U1, U2, U3, U4, & U5 are all scheduled on different (i.e., single) beams. User U6 is in a super soft hand off, with its data scheduled on both beam 1 and beam 2 simultaneously. Note that U1 receives data in consecutive timeslots as its data has either a high latency or Quality of Service (QOS) requirement, or U1 has a high data rate (due to favourable wireless conditions)

Beam selection is (initially) based on the results of scanning the reverse link signals from individual terminals (at the BTS) and assigning them a forward link beam that is estimated provide the best RF path, best service or highest data rate. After the best beam to a terminal has been determined based on the reverse link, it may turn out (although this is less common and it occurs mainly between the beams) that the RF channel is unbalanced between the forward and reverse links. This will become apparent by observing that the quality of the forward link is worse than expected and when this quality, or data rate or ARQ frequency exceeds some "configured" thresholds, then an alternate beam is selected for the user. Alternatively, the BTS may put the user in super soft handoff by illuminating additional forward link beams, (depending on the algorithm's configuration or data fill).

The Scheduler in the combined BS plus Scheduler configuration (i.e. the third architecture) tries to optimize several factors and the relative importance of each of these factors can be set by data filling the scheduler differently. To do this, the system assigns a score known as the "scheduler metric (SM)" for each packet in the user queue and the value of this metric is calculated depending on such factors as the quality of service (QOS) required for the particular user; the latency requirement (particularly for VoIP which is typically equal to 30 mS); and the RF quality of the channel at that slot instant (i.e. the data rate capability (DRC) or "rate" that the mobile is requesting), for example one could decide that the goal of the sector's algorithm would be to maximize data throughput for the sector. This is typically not implemented by most carriers as it does not necessarily satisfy all users within the sector. This is considered an unfair algorithm as it disproportionately favours the users with the "best" RF channels at the expense of everybody else.

A more preferred embodiment for a scheduler is known as "The proportional fairness algorithm" which tries to give as many users as possible access to slots in proportion to their channel capability (DRC). So in this algorithm good RF channel users get more slots per second than users with poorer channels "in proportion" to their relative RF channel. However, if a lower rate user has a latency requirement and his packet is getting close to the latency time limit his "metric" score will go up and he may be scheduled "next" in preference to a higher rate user that could have increased the overall sector throughput but would have "violated" the latency constraint of our low rate user. Similarly if a particular packet has a quality of service option that requires that it has precedence over "other" packets competing for the next slot then this will be reflected in a very high "metric" score and (usually) that packet will pre-empt others i.e. "jump the queue". Balancing these factors is an exercise that depends on the requirements of the cell, the carrier and the service level agreements, as is known in the art.

This needs to be balanced with the fact that "n" sets of beams are supported in a sector, and a plurality of (non-adjacent) beams can be scheduled to different users during the same time slot to increase capacity. However issues of interference and capacity are used to assign users to beams and to adjust the SM. For example the SM metric for a user can be adjusted depending on the number of beams within the sector they require. For example, for 3 beams, the SM for a user which requires all 3 beams may be adjusted downward to give priority to users that only require one beam, so that 3 users can be scheduled simultaneously on the 3 beams (or course, this is equivalent to increasing the SM for users that only require one beam).

Thus the SM for a user can be modified based on capacity (e.g., their affect on the sector as a whole). The SM for a user can also be modified based on the duration since they were last scheduled a timeslot.

So in summary, the goals of the combined beam selection algorithm plus scheduler are a "super set" of a single sector's scheduler running (for example) the proportional fairness algorithm but with the additional freedom that there are 3 beams available to adjust the metric scores of packets competing for the next slot.

Figure 4:
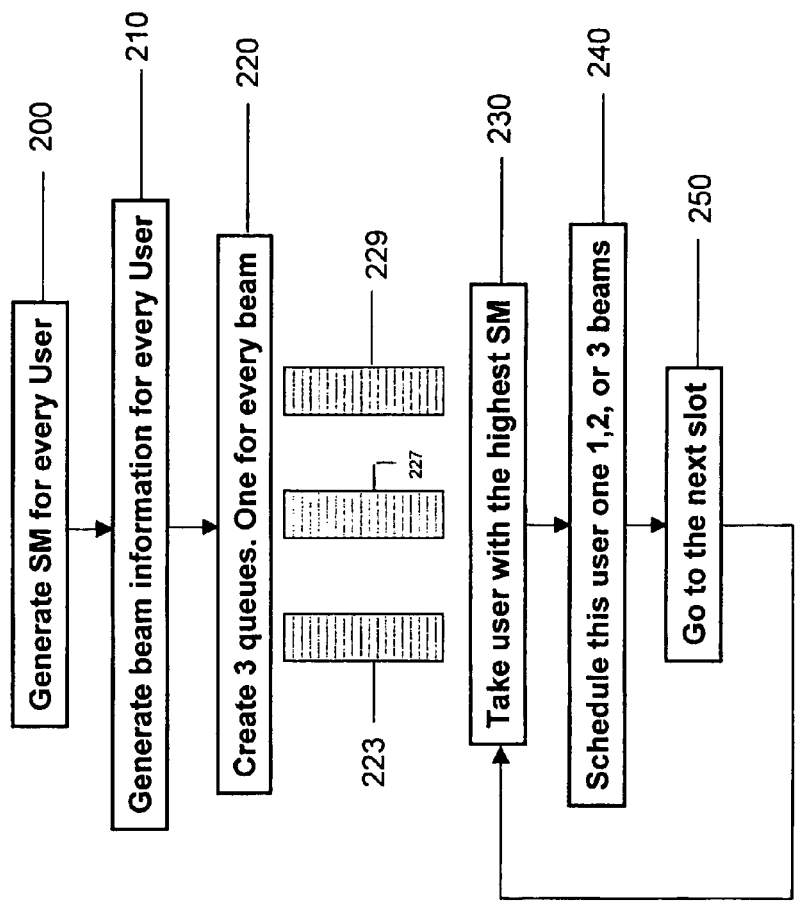
FIGS. 4-8 are flowcharts illustrating alternative algorithms executed by the a combined BSA/Scheduler implementation as illustrated in FIG. 5, for scheduling more than 1 user in one time slot on different beams.

As stated there are several approaches that a joint beam selector and scheduler can take according to different embodiments of the invention, the simplest is shown in FIG. 4 (Algorithm 1). According to this embodiment the scheduler metric (SM) is generated for every user 200. Then beam information for every user is generated 210 according to input received regarding the reverse link conditions for that user. Then a queue is generated 220 for every beam, in this case three beams. For example the queue for beam one is 223, the queue for beam two 227, the queue for beam three is 229. The user with the highest SM is determined 230 and is then scheduled on the appropriate beam or beams 240, for the first slot. This process repeats for each slot 250. Note that after some number of time slots the loop should return to step 200 to generate a new SM for every user and beam information for every user. This preferably happens after every time slot, in which case the loop from 250 to 230 should be understood to go from 250 to 200. However, depending on the expected conditions, processing power and other tradeoffs the scheduling of users per beams can occur for some interval of time slots without re-queuing the users on different beams as shown.

Figure 5:
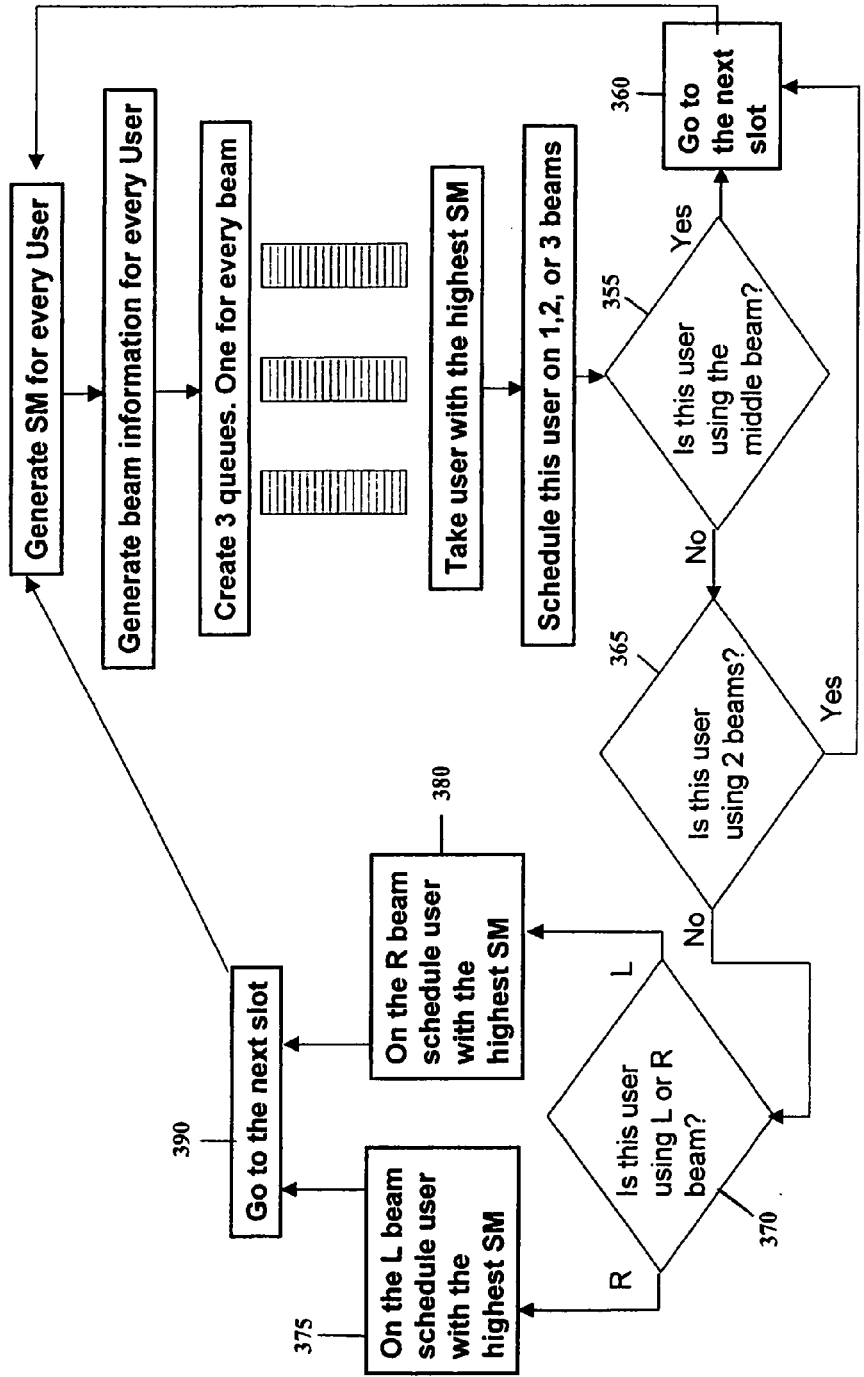

FIG. 5 (Algorithm 2) illustrates a slightly more complicated algorithm according to another embodiment of the invention. Here the slots in the two outer beams can be scheduled simultaneously to different users. This increases capacity while avoiding the interference which can result from the simultaneous scheduling of adjacent beams. The first several steps are similar for each of the different embodiments. After the user is scheduled on the appropriate number of beams the process then determines whether additional user data can be scheduled on other beams. Accordingly if a currently scheduled user is on the middle beam 355 the process then goes to the next slot. Here the process is illustrated to regenerate the SM and beam information for every user for every time slot. However as per the previous slide this could happen at different intervals in order to reduce complexity so that the next slot can simply look at the user with the highest SM and schedule on the current queues. Accordingly one or more time slots can be filled without regenerating the SM and beam information for every user. However it is preferred in terms of efficiency to generate the SM and beam information for every user for every slot. This also insures that one user with very high SM does not automatically take every consecutive time slot until step 200 is repeated. If the middle beam is not used by this user 365 and if the user is only using one beam then a determination is made 370 as to what data can be scheduled on the corresponding other outer beam. For example if the current user is using the right beam then the scheduler will schedule the user with the next highest SM on the left beam 375 before proceeding to the next slot 390. Correspondingly if the current user is on the left beam then the scheduler schedules the user with the next highest SM on the right beam 380. The next series of Figures describe different algorithms for scheduling more than one user in one slot on different beams. Each of these therefore adds efficiency as throughput is increased compared to the prior two embodiments, at the expense of more complexity as discussed previously.

Figure 6:
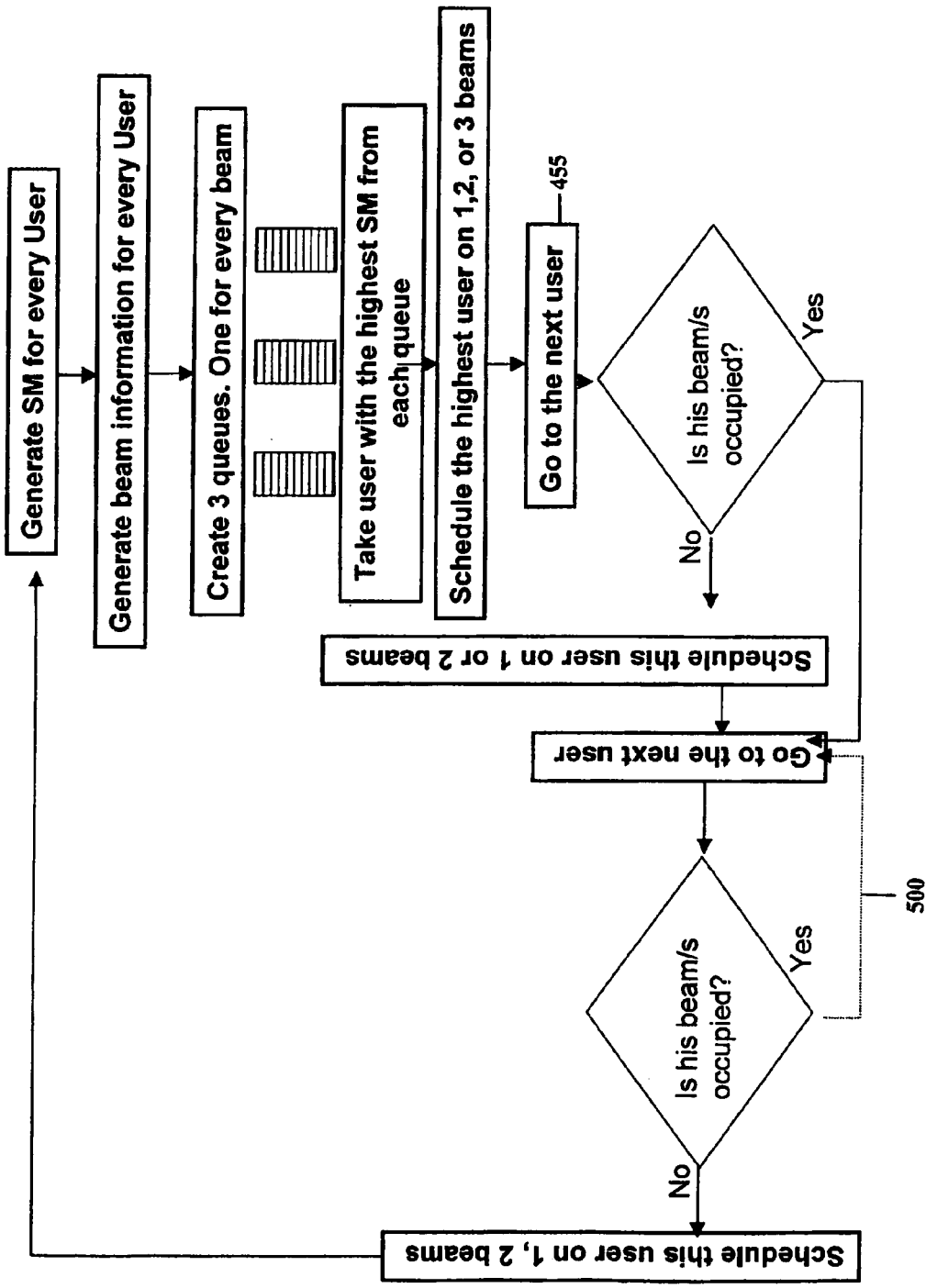

Turning to the example shown in FIG. 6, the first three steps of generating the scheduling metric and beam information for each user and then creating three queues, one for each beam are also carried out in this example. However, in this example, more than one user on each beam is possible depending on the radio conditions. Accordingly the algorithm looks at each queue in order to determine the user with the highest scheduling metric for each queue. Assuming three queues then there are potentially three users to consider, assuming each user is assigned a single beam. The first step is to evaluate the user with the highest scheduling metric and then schedule that user on the beams that user is assigned to. Assuming the user is not assigned to all three beams, then the next user (i.e., the user with the next highest SM) is evaluated 455.

If the next user's beam(s) is/are already occupied, then the user is placed back in the queue, as that user can not be scheduled in this timeslot. If the user's beams are not occupied, they are then scheduled in the current timeslot on their assigned beams. These steps are then repeated for the next user. That is to say if their beam(s) is/are available they are scheduled, if not they are placed back into the queue. As shown, the algorithm than repeats the process for the next time slot. This can result in unfilled timeslots on one or more beams. However it should be appreciated that if this is the case, as a variation, as shown by the dotted line 500, the system can continue to determine the user with the next highest SM in the unscheduled beam(s) until all beams contain user data in that time slot (or until all users in the queue for the unscheduled beam(s) have been evaluated. Of course, in this scenario, a suitable check to prevent an endless loop should be implemented.

Figure 7:
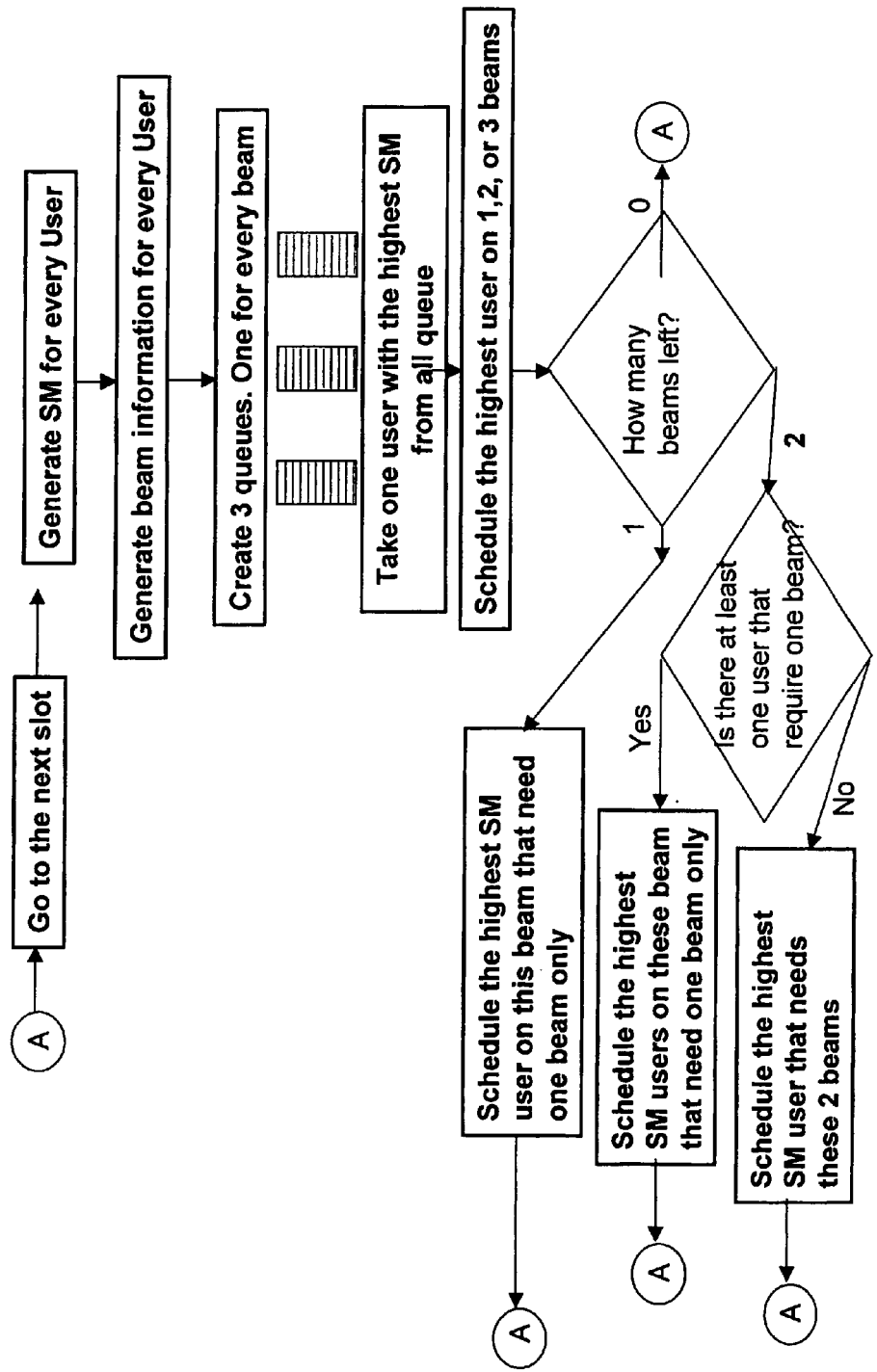

Another example is illustrated in FIG. 7 (Algorithm Four), which also allows for more than one user in the same slot on different beams. Once again the first three steps of generating a scheduling metric and beam information for every user producing a queue for each beam are followed. The next step is to determine the user with the highest SM from each queue. The user with the highest SM is then scheduled on the assigned beams.

The number of unused beams (that is to say the number of beams that the user was not assigned to) is determined. If the user is assigned all three beams, then the algorithm continues at the next time slot. If one beam remains unscheduled then the user with the next highest SM, that only needs the unscheduled beam, is scheduled. To clarify, the user with the highest SM in the unscheduled beam may require two beams—however that user can not be scheduled as only one beam available. If there is no such user, than no user data is transmitted in that timeslot on that beam. The algorithm then continues with the next time slot.

If there were two beams left after the first user is scheduled then the scheduler searches the queues for the remaining two beams to determine the users with the next highest SM in each queue that only require one beam each. The user data for these users is then scheduled for each of these users in their respective beams. The system then proceeds to the next time slot. Note as an alternative this last step could schedule the same user on both beams if that user has the highest SM in both remaining queues, or if there is only one user that needs one beam and there is a user that requires two beams.

Figure 8:
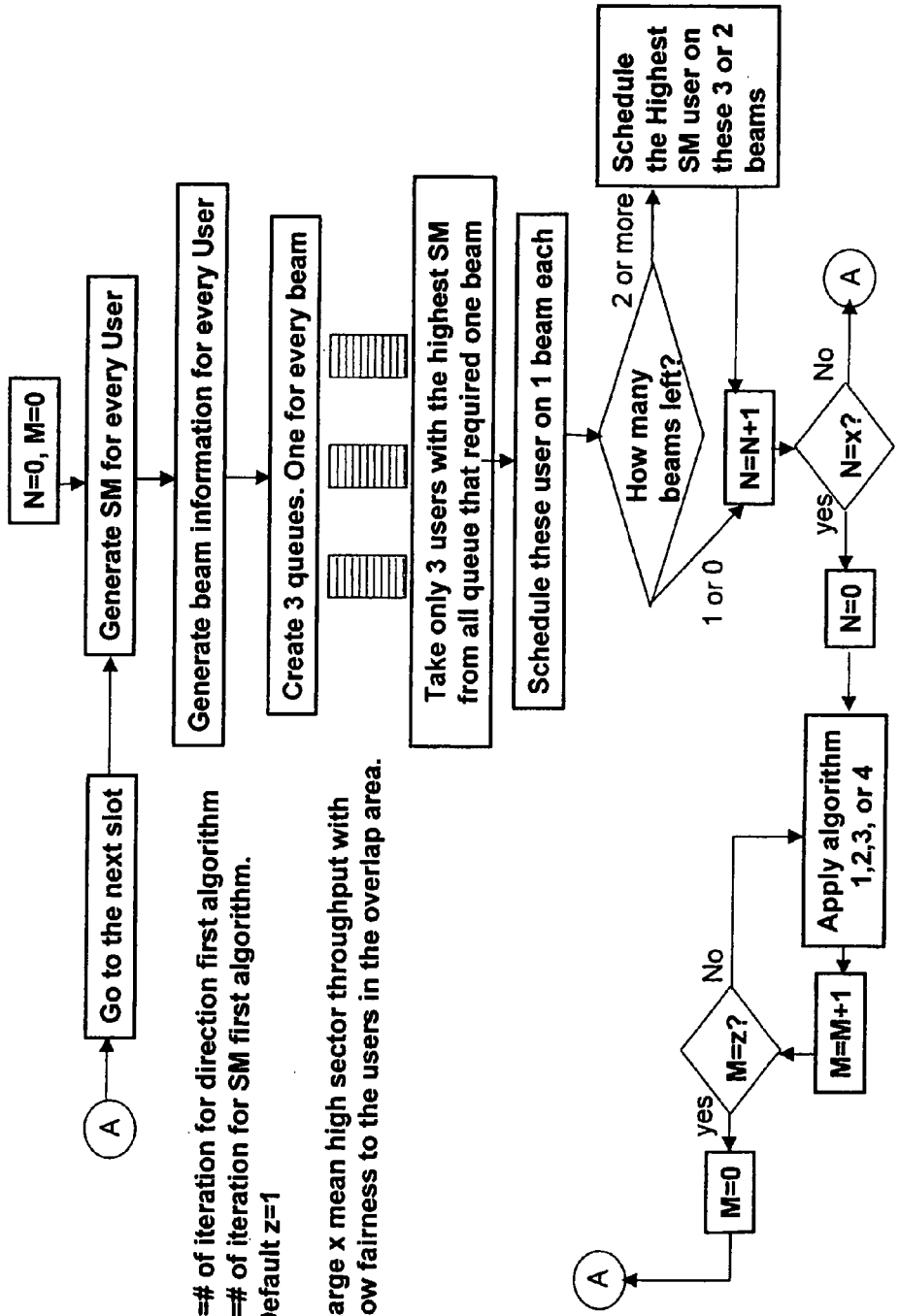

FIG. 8 (Algorithm 5) also allows for more than one user in the same slot on different beams. This algorithm allows different weights to be assigned to supporting super soft handoff (i.e. scheduling users how require multiple beams) and maximizing the number of users served (by prioritizing users who only require one beam). Once again the first three steps of generating a scheduling metric and beam information for every user producing a queue for each beam are followed. However, in this algorithm, two weighting factors x, and z are first assigned respective counters N and M, which are initially set to zero. The next step is to determine the user with the highest SM from each queue, which only requires a single beam. These users are then scheduled on the assigned beams.

The next two steps, which are optional as they may not occur too frequently, determines how many beams are left unscheduled for the current timeslot. If two or more beams are unscheduled (i.e., there are insufficient users who only require a single beam in the current timeslot), the algorithm will schedule the user with the highest SM who requires the number of unscheduled beams, if any.

Next counter N is incremented, and then compared with the weighting factor x. If N has not reached x, then the above steps are repeated.

If N has reached the x threshold, N is reset and the algorithm then proceeds to execute one of the proceeding algorithms which allow for super soft handoff, for z timeslots. Typically z=1, as typically the reason to do this is to maximize throughput. However, if a lot of mobility is expected in the timeslot, then z can be increased.

Note that a large value of x provides for a high sector throughput, as it increases the weight given to users who only require a single beam—thus allowing for x consecutive timeslots with all 3 beams assigned to different users. However, this comes at the expense of users in the overlap areas, or who are moving between areas, and require more than one beam.

As described, the combined scheduler and BS can be implemented using processors and software instructions for executing the methods discussed. This can include a single processor or multiple processors which communicate with each other. They can be combined in a single module, for example a data radio transmission unit (DRTU), which receives user data and produces scheduled time slots of user data which are then sent to one or more transceivers for transmission on the appropriate beams.

For example, the DRTU includes a beam selector for monitoring signals received from a given user in the service area of the beam forming antenna and causing the data traffic destined for that user to be transmitted using the beam providing the highest quality of signal to and from that user in a time slot selected by a scheduler such that, in at least some circumstances, data traffic will be sent simultaneously to more than one user within the sector supported by the beam forming antenna.

One method of ensuring each user receives their data is as follows. The DRTU generates a plurality of MAC indices and allocates one of said MAC indices to each destination user, and wherein user data destined for any given user is encoded with the MAC index allocated to said user, such that each user receiving data from any of the beams of said beam forming antenna can identify the data sent to said user. In some embodiments, the MAC indices can be reused to increase capacity. For example, the base station can evaluate the wireless conditions and if the wireless conditions indicate at least two users can share a MAC index without interference, than the same MAC index is allocated to said two users. This will typically happen if two users are served by different beams. Indeed, in some embodiments, the BTS does not need to evaluate the wireless conditions, but instead simply Reuses MAC indices on non-adjacent beams. However, this puts constraints on the ability to support super soft handoff. Accordingly, some MAC indices may be reserved for users that require super soft handoff, and such users will receive MAC indices which are not reused. For example, at least some MAC indices are only allocated to unique users, wherein users are allocated unique MAC indices if the wireless conditions provide for super soft hand off.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A base station for providing wireless communication to a plurality of users within a serving area comprising:
   An antenna array including a plurality of antennas with each antenna serving a sector of the serving area;
   At least one of said antennas comprising a plurality of beam forming antennas to divide the sector served by said antenna into a plurality of beams;
   Beam Selection and Scheduling means for assigning user traffic within the divided sector onto said beams, said controller executing a combined beam selector and scheduler that assigns user data to timeslots and beams; and
   A transceiver, coupled to said plurality of beam antennas, for transmitting said user data on the assigned beams during the assigned timeslots.

2. A Base station as claimed in claim 1 wherein said Beam Selection and Scheduling means comprises a beam selector means and scheduling means in sequence.

3. A Base station as claimed in claim 1 wherein said Beam Selection and Scheduling means comprises an integrated beam selector and scheduler for carrying out the steps of:
   a) generating information defining the beam or beams to be utilized by each user;
   b) generating a Scheduler Metric (SM) for every user;
   c) scheduling each of the n beams based on the SM and said information for each user.

4. A Base station as claimed in claim 3 wherein the integrated beam selector and scheduler carries out step a) by evaluating the reverse link signals received by the mobile in order to assign a user to the appropriate beam or beams.

5. A Base station as claimed in claim 4 wherein the integrated beam selector and scheduler further carries out step a) by receiving an indication of the forward link signal quality received by a user, and then adjusts the beam or beams allocated to a user if said forward link and reverse link signals are unbalanced for said user.

6. A Base station as claimed in claim 4 wherein the integrated beam selector and scheduler carries out a modified proportional fairness algorithm.

7. A method of transmitting wireless data to users within a sector served by a plurality of beam antennas which divides said sector into n beams comprising:

a. Evaluating the reverse link wireless conditions for each user;
   b. responsive to step a, generating information defining the beam or beams to be utilized by each user;
   c. generating a Scheduler Metric (SM) for every user;
   d. scheduling each of the n beams based on the SM and said information for each user; and
   e. transmitting data scheduled in step d on said n beams.

8. The method as claimed in claim 7 wherein step d comprises scheduling the user with the highest SM for a time slot on up to n beams to be utilized by that user.

9. The method as claimed in claim 7 wherein step d comprises:
   i) responsive to step b) arranging a queue for each beam, with user data assigned to each Queue
   ii) for the user with the highest Scheduler Metric in any of the queues, scheduling that user for a time slot on each of the beams assigned to that user; and
   iii) if the number of beams assigned for use in the time slot of step a is less than "n" beams, then determine the next user that has the next highest SM that utilizes only unassigned beams for said timeslot and assign that user to the same time slot as assigned in step iii).

10. The method as claimed in claim 9, further comprising:
    f. repeat step d until all beams for said timeslot are scheduled or until there is no data that can be scheduled for said timeslot.

11. The method as claimed in claim 10 further comprising repeating steps a-f for the next timeslot.

12. A data radio transmission unit (DRTU) for a base station comprising at least one antenna comprising a beam forming antenna for subdividing the sector supported thereby into n beams, said DRTU comprising:
    At least one processor and memory for storing software instructions for executing the method as claimed in claim 9.

13. A data radio transmission unit (DRTU) for a base station comprising at least one antenna comprising a beam forming antenna for subdividing the sector supported thereby into n beams, said DRTU comprising:
    At least one processor and memory for storing software instructions for executing the method as claimed in claim 7.

14. A combined beam selector and scheduler module for a base station that assigns multiple users per time slot on up to n beams comprising:
    a. scheduling means for scheduling the user with the highest Scheduler Metric in any of the queues, in a time slot on each of the beams assigned to that user;
    b. evaluation means for determining if the number of beams assigned for use in the time slot of step a is less than "n" beams; and
    c. means for determining the next user that has the next highest SM that utilizes only one unassigned beam and assigning that user to the same time slot as assigned by said scheduling means.

15. A base station for handling data traffic comprising:
    an antenna array for subdividing a service area into a plurality of sectors with an antenna for each sector;
    at least one said antenna comprising a beam forming antenna for subdividing the sector supported thereby into at least two beams; and
    at least one data radio transmission unit (DRTU) for transmitting data traffic to users via said antenna array; said DRTU including a controller for controlling data transmission with the sub-divided sector comprising:

a beam selector for selecting which beam to transmit data for any given user within a sub-divided sector; and a scheduler to divide the data traffic to be transmitted into time-slots and to assign user data to each of the established time slots.

16. The base station of claim 15 wherein the DRTU includes a beam selector for monitoring signals received from a given user in the service area of the beam forming antenna and causing the data traffic destined for that user to be transmitted using the beam providing the highest quality of signal to and from that user.

17. The base station of claim 15 wherein said DRTU includes a beam selector for monitoring signals received from a given user in the service area of the beam forming antenna and causing the data traffic destined for that user to be transmitted using the beam providing the highest quality of signal to and from that user in a time slot selected by a scheduler such that, in at least some circumstances, data traffic will be sent simultaneously to more than one user within the sector supported by the beam forming antenna.

18. The base station of claim 17 wherein the data traffic on each beam from the beam forming antenna is scheduled by a unique scheduler.

19. The base station of claim 15 wherein the DRTU includes a beam selector for monitoring signals received from a given user in the service area of the beam forming antenna and causing the data traffic destined for that user to be transmitted using the beams providing a high quality signal at the location of that user.

20. The base station of claim 19 wherein said DRTU generates a plurality of MAC indices and allocates one of said MAC indices to each destination user, and wherein user data destined for any given user is identified with the MAC index allocated to said user, such that each user receiving data from any of the beams of said beam forming antenna can identify the data sent to said user.

21. The base station as claimed in claim 20 wherein the wireless conditions are evaluated and if the wireless conditions indicate at least two users can share a MAC index without interference, than the same MAC index is allocated to said two users.

22. The base station as claimed in claim 21 wherein said at least two users are served by different beams.

23. The base station as claimed in claim 22 wherein at least some MAC indices are only allocated to unique users, wherein users are allocated unique MAC indices if the wireless conditions provide for super soft hand off.

* * * * *